(12) United States Patent
Sergeev et al.

(10) Patent No.: US 10,349,291 B2
(45) Date of Patent: Jul. 9, 2019

(54) METHOD AND SYSTEM FOR ESTABLISHING A SELF-ORGANIZED MOBILE CORE IN A CELLULAR COMMUNICATION NETWORK

(71) Applicant: ADVA Optical Networking SE, Meiningen (DE)

(72) Inventors: Andrew Sergeev, Kfar Saba (IL); Evgeny Zemlerub, Netanya (IL); Eyal Ben-Sa'adon, Karkur (IL)

(73) Assignee: Adva Optical Networking SE, Meiningen (DE)

( * ) Notice: Subject to any disclaimer, the term of this patent is extended or adjusted under 35 U.S.C. 154(b) by 39 days.

(21) Appl. No.: 14/932,015

(22) Filed: Nov. 4, 2015

(65) Prior Publication Data

US 2016/0135064 A1 May 12, 2016

(30) Foreign Application Priority Data

Nov. 6, 2014 (EP) .................................... 14003736

(51) Int. Cl.
| | |
|---|---|
| *H04M 3/00* | (2006.01) |
| *H04W 24/04* | (2009.01) |
| *H04W 24/02* | (2009.01) |
| *H04L 12/24* | (2006.01) |
| *H04L 12/707* | (2013.01) |
| *H04W 36/16* | (2009.01) |

(Continued)

(52) U.S. Cl.
CPC ......... *H04W 24/04* (2013.01); *H04L 41/0668* (2013.01); *H04L 45/22* (2013.01); *H04W 24/02* (2013.01); *H04W 36/16* (2013.01); *H04W 40/22* (2013.01); *H04W 40/246* (2013.01); *H04W 60/06* (2013.01)

(58) Field of Classification Search
None
See application file for complete search history.

(56) References Cited

U.S. PATENT DOCUMENTS

| | | | |
|---|---|---|---|
| 8,452,331 | B2 | 5/2013 | Zhang et al. |
| 8,873,398 | B2 | 10/2014 | Kempf et al. |

(Continued)

FOREIGN PATENT DOCUMENTS

| | | |
|---|---|---|
| EP | 1895785 A1 | 3/2008 |
| EP | 2713574 A1 | 4/2014 |

(Continued)

*Primary Examiner* — Moustapha Diaby
(74) *Attorney, Agent, or Firm* — The Webb Law Firm

(57) ABSTRACT

A method for establishing a self-organized emergency mobile core in a cellular communication network, the cellular communication network having a core element. The method includes the step of storing program code for implementing core network functionality on at least one stationary network element of the cellular communication network allowing to host virtual network functionality. The core network functionality remains inactive when the core element is available. The method includes the steps of detecting an emergency event within the cellular communication network resulting in an unavailability of the core element, and starting operating the core network functionality in order to establish a self-organized emergency mobile core in response to the detected emergency event.

13 Claims, 3 Drawing Sheets

(51) Int. Cl.
*H04W 40/22* (2009.01)
*H04W 40/24* (2009.01)
*H04W 60/06* (2009.01)

(56) References Cited

U.S. PATENT DOCUMENTS

| | | | |
|---|---|---|---|
| 2008/0020801 | A1 | 1/2008 | Fesas et al. |
| 2010/0220656 | A1* | 9/2010 | Ramankutty ......... H04L 45/025 370/328 |
| 2010/0299419 | A1* | 11/2010 | Ramankutty ......... H04W 24/02 709/221 |
| 2011/0235505 | A1* | 9/2011 | Eswara ................... H04L 43/10 370/221 |
| 2012/0002537 | A1* | 1/2012 | Bao ....................... H04W 24/04 370/221 |
| 2013/0121207 | A1 | 5/2013 | Parker |
| 2014/0155019 | A1* | 6/2014 | Schwartz .............. H04W 76/10 455/404.1 |
| 2015/0016330 | A1 | 1/2015 | Schwartz et al. |
| 2015/0156666 | A1* | 6/2015 | Won ................... H04W 28/0231 370/229 |
| 2015/0249931 | A1 | 9/2015 | Casati |

FOREIGN PATENT DOCUMENTS

| | | |
|---|---|---|
| WO | 2008011149 A2 | 1/2008 |
| WO | 2012120519 A1 | 9/2012 |
| WO | 2012160465 A1 | 11/2012 |

\* cited by examiner

METHOD AND SYSTEM FOR ESTABLISHING A SELF-ORGANIZED MOBILE CORE IN A CELLULAR COMMUNICATION NETWORK

CROSS-REFERENCE TO RELATED APPLICATION

This application claims priority to European Patent Application No. 14 003 736.7 filed Nov. 6, 2014, the disclosure of which is hereby incorporated in its entirety by reference.

BACKGROUND OF THE INVENTION

Field of the Invention

The present invention relates to a method and a system for establishing a self-organized mobile core in a cellular communication network having a core element, wherein a standalone mobile network is created when the core element becomes unavailable.

Description of Related Art

Common cellular communications networks provide convenient wireless communications services. These services include, for example, cellular telephone services, paging, Internet access, and data transfer services, among others.

Such a common cellular communication network includes a core element and a Radio Access Network (RAN). The core element comprises at least a connectivity gateway, a mobility management function and a home subscriber functionality. The Radio Access Network further comprises base stations and respective mobile stations, the client devices. Each of the client devices is typically connected to one of the base stations. This connection needs management of backhaul and core network connectivity, which is usually facilitated by the core element.

Therefore, if the core element becomes unavailable, for example when the core element is destroyed after a man-made or a natural disaster, the Radio Access Network becomes useless, even if the base stations are still undamaged and, therefore, available. Thus, there is a need for methods to enable use of the Radio Access Network even if the core element becomes unavailable, for example if the core element is destroyed after a man-made or a natural disaster.

WO 2012/120519 A1 discloses a communication system which comprises moving relays including base- and mobile-station functionality and a radio manager, all co-located, and emergency moving relays further including a simulated stationary network that includes a simulated IP connectivity gateway communicating with a simulated mobility management entity and simulating the operation of a stationary network in an emergency mode.

SUMMARY OF THE INVENTION

It is an object of the present invention to provide a method and a system for providing a standalone mobile network operative in an emergency mode.

The present invention provides a method for establishing a self-organized emergency mobile core in a cellular communication network, the cellular communication network having a core element. Herein, program code for implementing core network functionality is stored on at least one stationary network element of the cellular communication network allowing to host virtual network functionality, wherein the core network functionality remains inactive when the core element is available. Further, an emergency event within the cellular communication network resulting in an unavailability of the core element is detected and in response to the detected emergency event, operating the core network functionality is started in order to establish a self-organized emergency mobile core.

The method is based on program code for implementing core network functionality which is stored on at least one stationary network element of the cellular communication network allowing hosting virtual network functionality, in particular a software survival kit including all necessary core element software. The core network functionality can be operated in at least two different modes: If the core element is available, thus no emergency event resulting in an unavailability of the core element has been detected, the core network functionality remains inactive, and, if an emergency event resulting in an unavailability of the core element has been detected, the core network functionality starts operating in order to establish a self-organized mobile core. Thereby, an emergency mobile network can be created in an automated manner, allowing connectivity between client devices and undamaged base stations and, thus, a standalone mobile network can be created by survived network elements when the core element becomes unavailable. The standalone network can be created without requiring additional effort or appropriate adaptions to the cellular communication network. In particular, no car based deployment of base stations to the emergency area is required.

The at least one stationary network element of the cellular communication network allowing to host virtual network functionality can be a base station or a network interface device. A virtualized network function, or VNF, typically consists of one or more virtual machines running different software and processes, on top of industry standard high volume servers, switches and storage, or even cloud computing infrastructure, instead of having custom hardware appliances for each network function. Since base stations and network interface devices of common cellular communication systems comprise a processor adapted to run a virtual machine, these components allow hosting of virtual network functionality. Therein, program code for implementing core network functionality is preferably stored on all base stations within the cellular communication network.

Further, the core network functionality can include all mobile core entities required for establishing connection between a client device and the cellular communication network. In particular, the core network functionality can include a connectivity gateway functionality, a mobility management entity functionality and a home subscriber server functionality. A connectivity gateway provides connectivity from client devices to external data networks by being the point of exit and entry for the traffic of the client device. The mobility management entity is the key control node for the network access.

It is responsible for idle mode client devices paging and tagging procedure including retransmissions. The home subscriber server function is a master user database that supports network entities that actually handle calls. It contains the subscription-related information, the subscriber profiles, performs authentication and authorization of the user, and can provide information about the subscriber's location and IP information. Thus, the core network functionality includes all necessary functionality to establish the self-organized emergency mobile core, thereby creating the standalone network. However, the core network functionality can include further software functionality of a common core element of a cellular communication network, too, for example multimedia subsystem functionality.

The method can further comprise the step of dropping communication of the client device with the core element and connecting the client device to the self-organized emergency mobile core in response to the detected emergency event. Thereby, it is allowed to populate core element functionality in order to route traffic between client devices, wherein minimal interruption to communication of the client devices is felt.

In some embodiments, the program code for implementing core network functionality is stored on at least two stationary network elements of the cellular communication network allowing to host virtual network functionality, and the method comprises the following: One of the at least two stationary network elements on which the program code for implementing core network functionality is stored is selected as a master element for operating the core network functionality based on the reachability of the respective network element and/or the performance of the respective network element. Then operating the core network functionality is started on the master element in order to establish a self-organized emergency mobile core in response to the detected emergency event.

In some further embodiments, the program code for implementing core network functionality is stored on at least two stationary network elements of the cellular communication network allowing to host virtual network functionality, and the method comprises the following: Operating the core network functionality is started on at least two stationary network elements which interconnect with each other in order to establish the self-organized emergency mobile core in response to the detected emergency event, wherein the at least two stationary network elements on which the core network functionality is operated are selected according to their reachability and/or their performance.

Thus, the core network functionality in order to establish a self-organized mobile core can either be operated on one master element or shared on one or more network elements, for example if the cellular communication network comprises a large amount of base stations. In each case, the master element or the network elements on which the core network functionality is operated should be selected according to their reachability to other network elements and/or according to their performance. Thus, a self-organized standalone network can be created for optimal data path between multiple network elements.

Also, the method can comprise the steps of detecting that the core element is reaccessible after the emergency event and terminating operating the core network functionality and restarting communication over the core element in response to the reaccessibility of the core element. Thus, a further handover process for reconnection is established, for restarting the core element and reconnecting data flow to the core element, when the core element is again reaccessible after the emergency event, thus operating the cellular communication network in its normal mode.

In some embodiments, the method can further comprise the steps of detecting if there are one or more undamaged base stations in response to the detected emergency event and creating a coverage map of a remaining network by means of the one or more undamaged base stations discovering each other via available active interconnections, if there are one or more undamaged base stations. Further, it is determined if at least one of the one or more undamaged base stations has connectivity to the core element and communication of the client device with the core element in the remaining network is started, if at least one of the undamaged base stations has connectivity to the core element. Thus, if it is determined that one or more undamaged base stations still have core element connectivity after an emergency event has been detected, a remaining network can be created by means of the undamaged base stations and traffic can be routed to client devices without having to create a standalone emergency mobile network, wherein minimal interruption to client devices is felt.

A system for establishing a self-organized emergency mobile core in a cellular communication network is also provided. Herein, the cellular communication network has a core element and the system comprises at least one stationary network element of the cellular communication network allowing to host virtual network functionality and a detection means for detecting an emergency event within the cellular communication network resulting in an unavailability of the core element. The at least one stationary network element of the cellular communication network allowing to host virtual network functionality comprises a storage unit in which program code for implementing core network functionality is stored and the system comprises a processing means for starting operating the core network functionality in order to establish a self-organized emergency mobile core in response to an emergency event detected by the detection means.

The system is based on program code for implementing core network functionality which is stored in the storage unit of at least one stationary network element of the cellular communication network allowing hosting virtual network functionality, in particular a software survival kit including all necessary core element software. The core network functionality can be operated in at least two different modes: If it is detected that the core element is available, thus no emergency event resulting in an unavailability of the core element has been detected by the detection means, the core network functionality remains inactive, and, if the detection means detects an emergency event resulting in an unavailability of the core element, the processing means starts operating the core network functionality in order to establish a self-organized mobile core. Thereby, the system can create an emergency mobile network in an automated manner, allowing connectivity between client devices and undamaged base stations and, thus, a standalone mobile network can be created by survived network elements when the core element becomes unavailable. The standalone network can be created without requiring additional effort or appropriate adaptions to the cellular communication network. In particular, no car based deployment of base stations to the emergency area is required.

The at least one stationary network element of the cellular communication network allowing to host virtual network functionality can be a base station or a network interface device. A virtualized network function, or VNF, typically consists of one or more virtual machines running different software and processes, on top of industry standard high volume servers, switches and storage, or even cloud computing infrastructure, instead of having custom hardware appliances for each network function. Since base stations and network interface devices of common cellular communication systems comprise a processor adapted to run a virtual machine, these components allow hosting of virtual network functionality. Therein, program code for implementing core network functionality is preferably stored on all base stations within the cellular communication network.

Further, the core network functionality can include all mobile core entities required for establishing connection between a client device and the cellular communication net-work. In particular, the core network functionality can include a connectivity gateway functionality and, a mobility management entity functionality and a home subscriber server functionality. A connectivity gateway provides connectivity from client devices to external data networks by being the point of exit and entry for the traffic of the client device. The mobility management entity is the key control node for the network access. It is responsible for idle mode client devices paging and tagging procedure including retransmissions. The home subscriber server function is a master user data-base that supports network entities that actually handle calls. It contains the subscription-related information, the subscriber profiles, performs authentication and authorization of the user, and can provide information about the subscriber's location and IP information. Thus, the core network functionality includes all necessary functionality to establish the self-organized emergency mobile core, thereby creating the standalone network. However, the core network functionality can include further software functionality of a common core element of a cellular communication network, too, for example multimedia subsystem functionality.

Further, the system can comprise a means for dropping communication of a client device with the core element in response to an emergency event detected by the detection means and a connecting means for connecting the client device to the self-organized emergency mobile core in response to an emergency event detected by the detection means. By the means for dropping communication and the connecting means, it is allowed to populate core element functionality in order to route traffic between client devices, wherein minimal interruption to the communication of the client devices is felt.

In some embodiments, the system comprises at least two stationary network elements of the cellular communication network allowing to host virtual network functionality, wherein each of the at least two stationary network elements of the cellular communication network allowing to host virtual network functionality comprises a storage unit in which the program code for implementing core network functionality is stored. The system further comprises a selecting means for selecting one of the at least two stationary network elements as a master element for operating the core network functionality based on the reachability of the respective network element and/or the performance of the respective network element and the processing means starts operating the core network functionality on the master element in response to an emergency event detected by the detection means.

In some further embodiments, the system comprises at least two stationary network elements of the cellular communication network allowing to host virtual network functionality, wherein each of the at least two stationary network elements of the cellular communication network allowing to host virtual network functionality comprises a storage unit in which the program code for implementing core network functionality is stored. The processing means starts operating the core network functionality on at least two network elements which interconnect with each other in order to establish the self-organized emergency mobile core in response to an emergency event detected by the detection means. The stationary network elements on which the core network functionality is operated are selected according to their reachability and/or their performance.

Thus, the processing means can either start operating the core network functionality in order to establish a self-organized mobile core on one master element or shared on one or more network elements, for example if the cellular communication network comprises a large amount of base stations. In each case, the master element or the network elements on which the core network functionality is operated should be selected according to their reachability to other network elements and/or according to their performance. Thus, the system can create a self-organized standalone network for optimal data path between multiple network elements.

Also, the system can comprise a second detection means for detecting that the core element is reaccessible after an emergency event has been detected by the detection means, a terminating means for terminating operating the core network functionality and a means for restarting communication over the core element in response to the reaccessibility of the core element. Thus, a further handover process for reconnection is established by the second detection means, the terminating means and the means for restarting communication over the core element, for restarting the core element and reconnecting data flow to the core element, when the core element is again reaccessible after the emergency event, thus operating the cellular communication network in its normal mode.

Furthermore, the system can also comprise a third detection means for detecting if there are one or more undamaged base stations in response to the detected emergency event detected by the detection means and creating means for creating a coverage map of a remaining network by means of the one or more undamaged base stations discovering each other via available active interconnections, if there are one or more undamaged base stations. Further, the system can comprise a determining means for determining if at least one of the one or more undamaged base stations has connectivity to the core element and a second connecting means for starting communication of the client device with the core element in the remaining network, if at least one of the undamaged base stations has connectivity to the core element. Thus, if it is determined that one or more undamaged base stations still have core element connectivity after an emergency event has been detected, a remaining network can be created by means of the undamaged base stations and traffic can be routed to client devices without having to create a standalone emergency mobile network, wherein minimal interruption to client devices is felt.

BRIEF DESCRIPTION OF THE DRAWINGS

Embodiments of the invention will now be described with reference to the drawings.

DETAILED DESCRIPTION OF THE INVENTION

Figure 1:
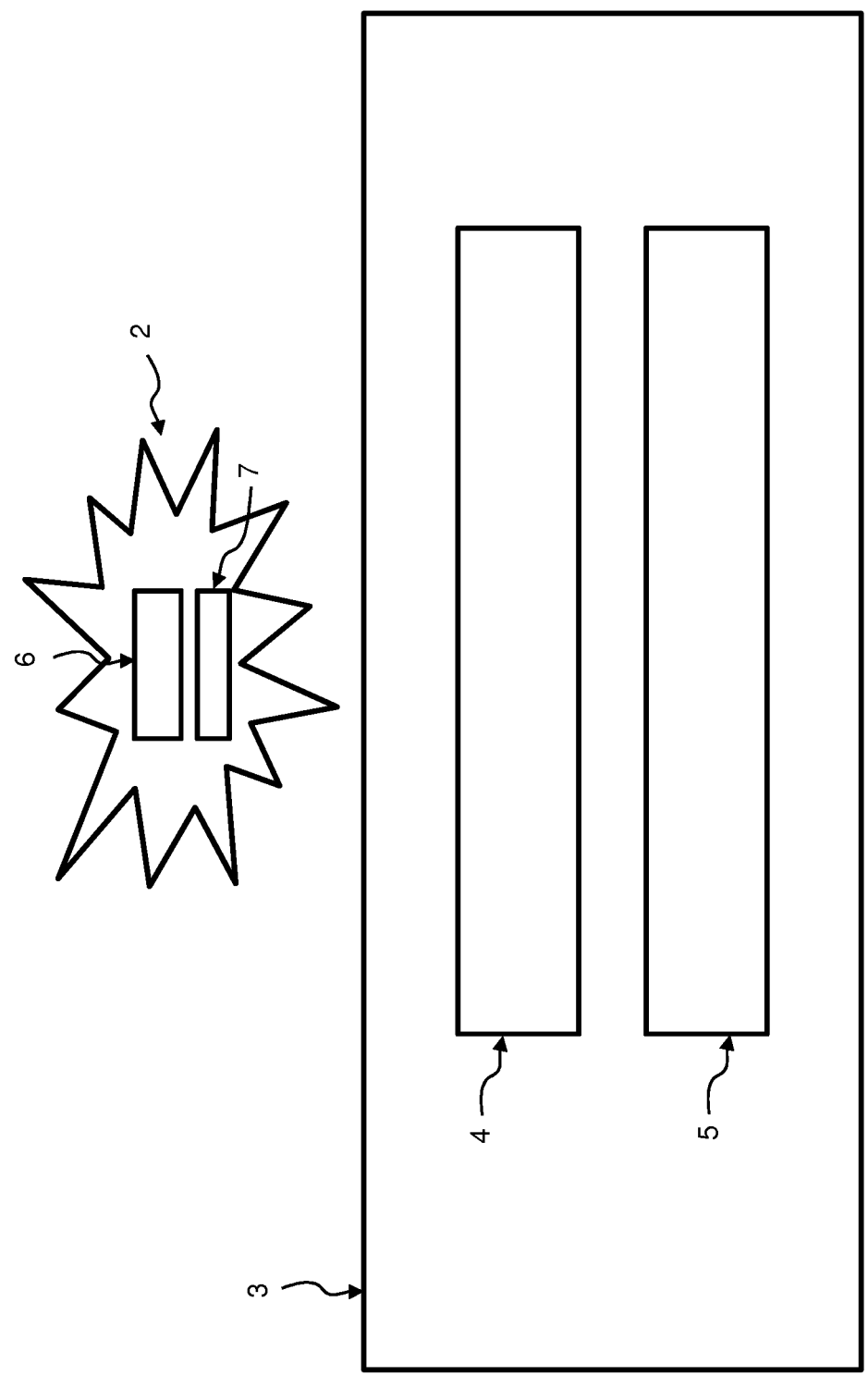
FIG. 1 illustrates a cellular communication network.

FIG. 1 illustrates a cellular communication network 1. As shown in FIG. 1, the cellular communication network comprises a core element 2 and a Radio Access Network (RAN) 3. According to FIG. 1, the Radio Access Network 3 further comprises base stations 4 and respective mobile stations, the client devices 5. Each of the client devices 5 is typically connected to one of the base stations 4. This connection needs management of backhaul and core network connectivity, which is usually facilitated by the core element 2. As shown in FIG. 1, the core element 2 includes at least a connectivity gateway functionality 6 and a mobility management functionality 7.

However, if the core element 2 becomes unavailable, for example when the core element 2 is destroyed after a man-made or a natural disaster, the Radio Access Network 3 becomes useless, even if the base stations 4 are still undamaged and, therefore, available. Thus, there is a need for methods to enable use of the Radio Access Network 3 even if the core element 2 becomes unavailable, for example if the core element is destroyed after a man-made or a natural disaster.

Figure 2:
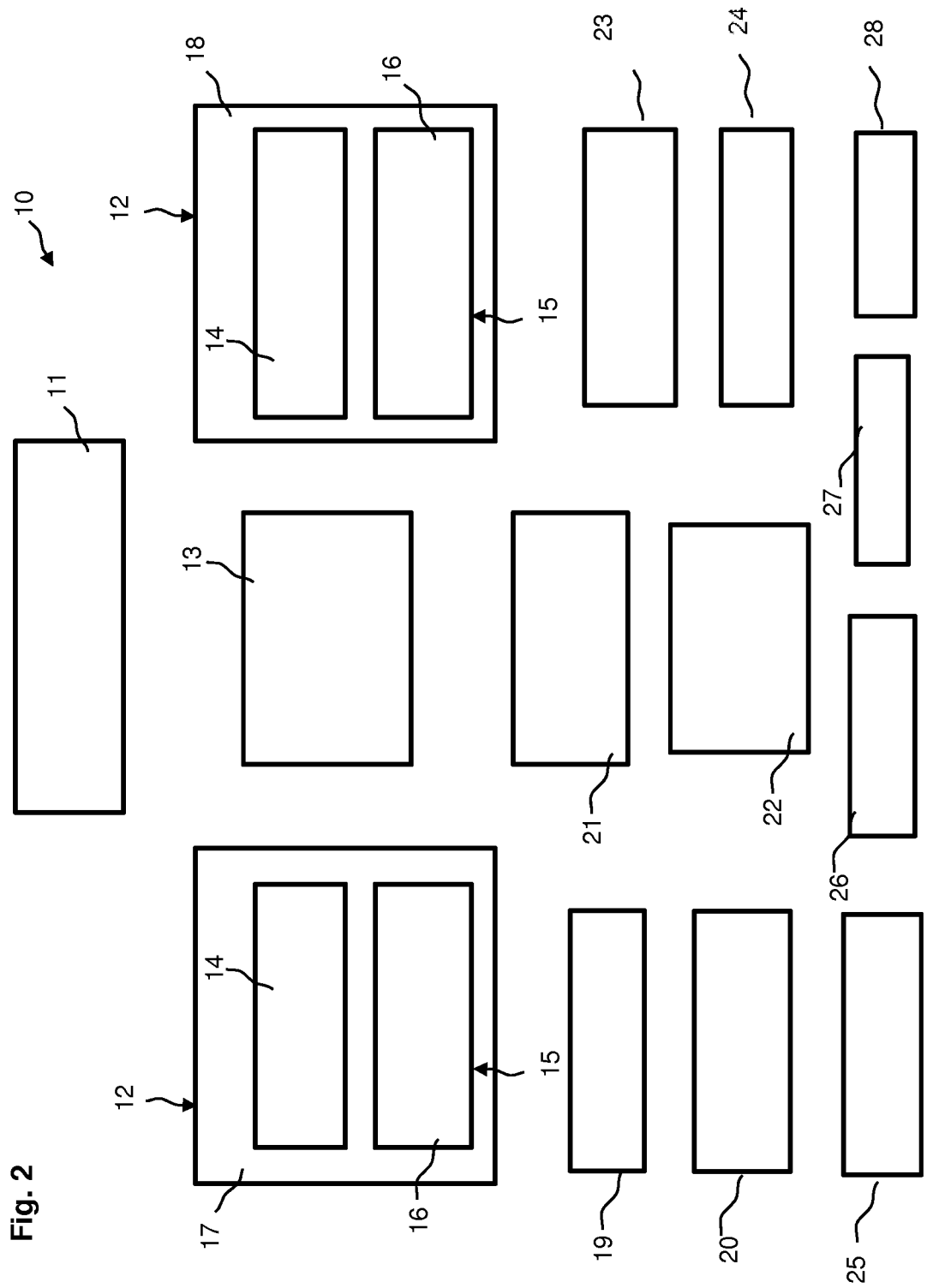
FIG. 2 illustrates a system for establishing a self-organized mobile core in a cellular communication network according to embodiments of the present invention.

FIG. 2 illustrates a system 10 for establishing a self-organized mobile core in a cellular communication network according to embodiments of the present invention.

The cellular communication network has a core element 11, providing at least a connectivity gateway, a mobility management functionality and a home subscriber server functionality.

According to the embodiment of FIG. 2, the system 10 comprises two stationary network elements 12 of the cellular communication network allowing to host virtual network functionality and a detection means 13 for detecting an emergency event within the cellular communication network resulting in an unavailability of the core element 11.

According to the shown embodiment, each of the two stationary network elements 12 of the cellular communication network allowing to host virtual network functionality comprises a storage unit 14 in which program code for implementing core network functionality is stored and the system 10 further comprises a processing means 15 for starting operating the core network functionality in order to establish a self-organized emergency mobile core in response to an emergency event detected by the detection means 13. The processing means is realized by the processors 16 of the two stationary network elements 12.

Thus, FIG. 2 illustrates a system 10 for establishing a self-organized emergency mobile core in a cellular communication network, which is based on program code for implementing core network functionality that is stored in the storage units 14 of the two stationary network elements 12 of the cellular communication network allowing hosting virtual network functionality. The core network functionality can be operated in at least two different modes: If it is detected that the core element is available, thus no emergency event resulting in an unavailability of the core element 11 has been detected by the detection means 13, the core network functionality remains inactive, and, if the detection means 13 detects an emergency event resulting in an unavailability of the core element 11, the processing means 15 starts operating the core network functionality in order to establish a self-organized mobile core. Thereby, the system 10 can create an emergency mobile network in an automated manner, allowing connectivity between client devices and undamaged base stations and, thus, a standalone mobile network can be created when the core element 11 becomes unavailable. The standalone network can be created without requiring additional effort or appropriate adaptions to the cellular communication network. In particular, no car based deployment of base stations to the emergency area is required.

According to the embodiment shown in FIG. 2, the two stationary network elements 12 of the cellular communication network allowing to host virtual network functionality are a base station 17 and a network interface device 18.

Further, the core network functionality includes a connectivity gateway functionality as well as a mobile management functionality and a home subscriber server functionality. However, the core network functionality can include further software functionality of a common core element of a cellular communication network, too, for example multimedia subsystem functionality.

There is further shown a means 19 for dropping communication of a client device with the core element 11 in response to an emergency event detected by the detection means 13 and a connecting means 20 for connecting the client device to the self-organized emergency mobile core in response to an emergency event detected by the detection means 13, thereby allowing to populate core element functionality in order to route traffic between client devices.

According to the embodiment shown in FIG. 2, the system 10 further comprises a selecting means 21 for selecting one of the two stationary network elements 12 as a master element for operating the core network functionality based on the reachability of the respective network element and/or the performance of the respective network element. Therein, the processing means 15 starts operating the core network functionality on the master element in response to an emergency event detected by the detection means 13. However, the processing means can also be accomplished to start operating the core network functionality on the two stationary network elements 12 which can therefore interconnect with each other, in order to establish the self-organized emergency mobile core in response to an emergency event detected by the detection means 13. In either case, the master element or the network elements on which the core network functionality is operated should be selected according to their reachability to other network elements and/or according to their performance in such a way that the system 10 can create a self-organized standalone network for optimal data path between multiple network elements.

The shown system 10 further comprises a second detection means 22 for detecting that the core element 11 is reaccessible again after an emergency event has been detected by the detection means 13, a terminating means 23 for terminating operating the core network functionality and a means 24 for restarting communication over the core element 11 in response to the reaccessibility of the core element 11. Thus, a further handover process for reconnection is established by the second detection means 22, the terminating means 23 and the means 24 for restarting communication over the core element 11, for restarting the core element 11 and reconnecting data flow to the core element 11, when the core element 11 is again reaccessible after the emergency event, thus operating the cellular communication network in the normal mode.

There is further shown a third detection means 25 for detecting if there are one or more undamaged base stations in response to the detected emergency event detected by the detection means 13 and creating means 26 for creating a coverage map of a remaining network by means of the one or more undamaged base stations discovering each other via available active interconnections, if there are one or more undamaged base stations. Further, the system 10 according to the embodiment of FIG. 2 comprises a determining means 27 for determining if at least one of the one or more undamaged base stations has connectivity to the core element 11 and a second connecting means 28 for starting communication of the client device with the core element 11 in the remaining network, if at least one of the undamaged base stations has connectivity to the core element 11.

Figure 3:
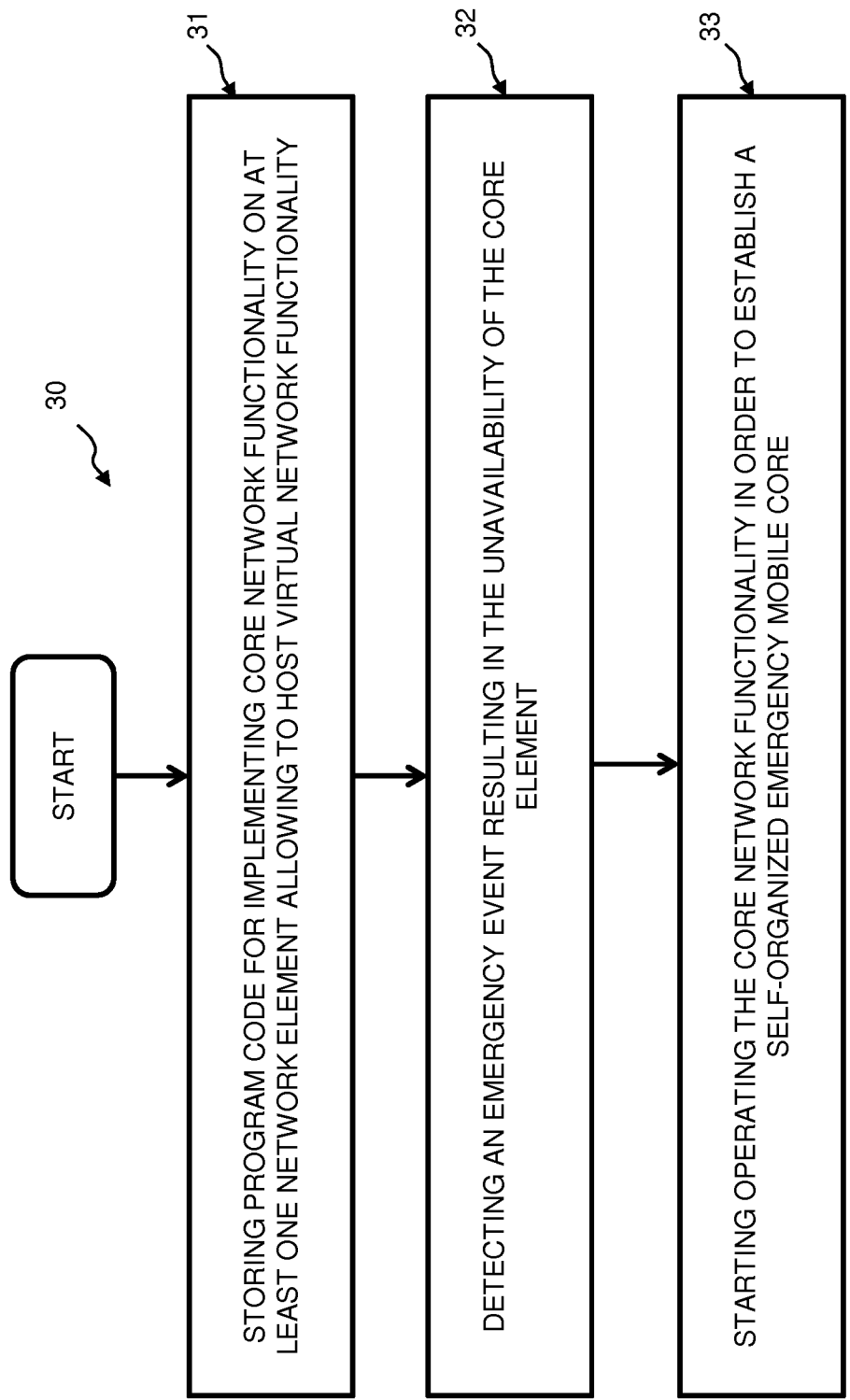
FIG. 3 illustrates a flow chart of a method for establishing a self-organized mobile core in a cellular communication network according to embodiments of the present invention.

FIG. 3 illustrates a flow chart of a method 30 for establishing a self-organized mobile core in a cellular communication network according to embodiments of the present invention. The cellular communication network has a core element and the method comprises the following: In a first step 31, program code for implementing core network functionality is stored on at least one stationary network element of the cellular communication network allowing to host virtual network functionality, wherein the core network functionality remains inactive when the core element is available. Then, in step 32, it is detected whether an emergency event within the cellular communication network resulting in an unavailability of the core element occurred. If it is detected in step 32 that an emergency event within the cellular communication network resulting in the unavailability of the core element occurred, operating the core network functionality is started in step 33, in order to establish a self-organized emergency mobile core.

Step 32 comprises running an intelligent algorithm for core element failure detection in order to detect whether an emergency event within the cellular communication network resulting in the unavailability of the core element occurred or not. If it is detected that no emergency event within the cellular communication network resulting in the unavailability of the core element occurred, the cellular communication network is operated in its normal mode, and thus data flow within the cellular communication network is connected to the core element. If it is detected that an emergency event within the cellular communication network resulting in the unavailability of the core element occurred, the method continues with step 33 in order to establish a self-organized emergency mobile core and thus with the creation of a standalone mobile network.

LIST OF REFERENCE SIGNS 1 cellular communication network
2 core element
3 Radio Access Network
4 base station
5 client device
6 connectivity gateway functionality
7 mobility management functionality
10 system
11 core element
12 stationary network element
13 detection means
14 storage unit
15 processing means
16 processor
17 base station
18 network interface device
19 means
20 connecting means
21 selecting means
22 second detection means
23 terminating means
24 means
25 third detection means
26 creating means
27 determining means
28 second connecting means
30 method
31 step
32 step
33 step

The invention claimed is:

1. A method for establishing a self-organized emergency mobile core in a cellular communication network, the cellular communication network having a core element and a Radio Access Network (RAN), the method comprising the steps of:
    storing program code for implementing core network functionality on stationary network elements that are part of the RAN of the cellular communication network allowing to host virtual network functionality, wherein the program code for implementing core network functionality stored on each stationary network element remains inactive when the core element is available, wherein the core network functionality includes a connectivity gateway functionality, a mobility management entity functionality, and a home subscriber server functionality, wherein the stationary network elements comprise all base stations of the RAN;
    detecting an emergency event within the cellular communication network resulting in an unavailability of the core element;
    starting operating, on at least one stationary network element, the program code for implementing core network functionality in order to establish a self-organized emergency mobile core in response to the detected emergency event;
    detecting if there are one or more undamaged base stations in response to the detected emergency event;
    if there are one or more undamaged base stations, creating a coverage map of a remaining network by means of the one or more undamaged base stations discovering each other via available active interconnections;
    determining if at least one of the one or more undamaged base stations has connectivity to the core element; and
    starting communication of the client device with the core element in the remaining network, if at least one of the one or more undamaged base stations has connectivity to the core element.

2. The method according to claim 1, wherein the stationary network elements include a network interface device.

3. The method according to claim 2, wherein the core network functionality includes all mobile core entities required for establishing connection between a client device and the cellular communication network.

4. The method according to claim 3, wherein the method further comprises the step of:
    dropping communication of the client device with the core element and connecting the client device to the self-organized emergency mobile core in response to the detected emergency event.

5. The method according to claim 1, wherein the core network functionality includes all mobile core entities required for establishing connection between a client device and the cellular communication network.

6. The method according to claim 5, wherein the method further comprises the step of:
    dropping communication of the client device with the core element and connecting the client device to the self-organized emergency mobile core in response to the detected emergency event.

7. The method according to claim 1, the method further comprises the steps of:
    selecting one of the stationary network elements on which the program code for implementing core network functionality is stored as a master element for operating the core network functionality based on a reachability of the respective network element and/or a performance of the respective network element; and starting operating of the program code for implementing the core network functionality on the master element in order to establish the self-organized emergency mobile core in response to the detected emergency event.

8. The method according to claim 1, wherein the method further comprises the step of:

starting operating of the program code for implementing the core network functionality on at least two stationary network elements which interconnect with each other in order to establish the self-organized emergency mobile core in response to the detected emergency event, wherein the at least two stationary network elements on which the program code for implementing the core network functionality is operated are selected according to their reachability and/or their performance.

9. The method according to claim 1, wherein the method further comprises the steps of:

detecting that the core element is reaccessible after the emergency event;

terminating operating of the program code for implementing the core network functionality and restarting communication over the core element in response to the reaccessibility of the core element.

10. A system for establishing a self-organized emergency mobile core in a cellular communication network, the cellular communication network having a core element and a Radio Access Network (RAN), the system comprising stationary network elements that are part of the RAN of the cellular communication network allowing to host virtual network functionality and a detector configured to detect an emergency event within the cellular communication network resulting in an unavailability of the core element, wherein the stationary network elements comprise all base stations of the RAN, wherein each stationary network element of the cellular communication network allowing to host virtual network functionality comprises a storage unit in which program code for implementing core network functionality is stored and wherein the system comprises a processor configured to start, on at least one stationary network element, operating of the program code for implementing the core network functionality in order to establish a self-organized emergency mobile core in response to an emergency event detected by the detector, wherein the core network functionality includes a connectivity gateway functionality, a mobility management entity functionality, and a home subscriber server functionality, wherein the system is configured to detect one or more undamaged base stations in response to the detected emergency event, create a coverage map of a remaining network by means of the one or more undamaged base stations discovering each other via available active interconnections, determine that one of the one or more undamaged base stations has connectivity to the core element, and start communication of the client device with the core element in the remaining network via the one or more undamaged base stations having connectivity to the core element.

11. The system according to claim 10, wherein the stationary network elements include a network interface device.

12. The system according to claim 10, wherein the core network functionality includes all mobile core entities required for establishing connection between a client device and the cellular communication networks.

13. The system according to claim 10, wherein each stationary network element of the cellular communication network allowing to host virtual network functionality comprises a storage unit in which the program code for implementing core network functionality is stored, and wherein the processor starts operating the program code for implementing core network functionality on at least two stationary network elements which interconnect with each other in order to establish the self-organized emergency mobile core in response to an emergency event detected by the detector, wherein the at least two stationary network elements on which the program code for implementing core network functionality is operated are selected according to their reachability and/or their performance.

* * * * *